(12) United States Patent
Ohkawa

(10) Patent No.: US 11,349,575 B1
(45) Date of Patent: May 31, 2022

(54) COMMUNICATION METHOD USING THE ENTANGLED STATE

(71) Applicant: Narumi Ohkawa, Kuwana (JP)

(72) Inventor: Narumi Ohkawa, Kuwana (JP)

( * ) Notice: Subject to any disclaimer, the term of this patent is extended or adjusted under 35 U.S.C. 154(b) by 37 days.

(21) Appl. No.: 16/974,210

(22) Filed: Nov. 16, 2020

(51) Int. Cl.
*H04B 10/00* (2013.01)
*H04B 10/70* (2013.01)
*G02F 1/35* (2006.01)
*H04B 10/07* (2013.01)
*G02F 1/39* (2006.01)
*H04J 14/00* (2006.01)

(52) U.S. Cl.
CPC ........... *H04B 10/70* (2013.01); *G02F 1/3503* (2021.01); *G02F 1/3526* (2013.01); *G02F 1/39* (2013.01); *H04B 10/07* (2013.01)

(58) Field of Classification Search
CPC ....................................................... H04B 10/70
See application file for complete search history.

(56) References Cited

U.S. PATENT DOCUMENTS

| | | | | |
|---|---|---|---|---|
| 2012/0237209 A1* | 9/2012 | Ohkawa | ................. | H04B 10/70 398/25 |
| 2012/0237210 A1* | 9/2012 | Ohkawa | ................. | H04B 10/70 398/25 |

FOREIGN PATENT DOCUMENTS

| | | | |
|---|---|---|---|
| JP | 2011166250 A | * | 8/2011 |
| JP | P2011-166250 A | | 8/2011 |

OTHER PUBLICATIONS

Singh et al., "Optical Polarization Multistability in Reflection in a Semi-Infinite Isotropic Nonlinear Kerr Medium", Mar. 27, 2012, The European Physical Journal (Year: 2012).*
D.K.Singh, H.Prakash Eur. Phys. J. D (2012) 66:70 DOI:10.1140/epjd/e2012-20362-8 Optical polarization multistability in reflection in a semi-infinite isotropic nonlinear Kerr medium.
Fundamentals of Photonics by Bahaa E.A.Saleh & Malvin Carl Teich published 1991 by John Wiley & Sons,Inc. Chapter 6.

* cited by examiner

*Primary Examiner* — Daniel G Dobson

(57) ABSTRACT

Two photons in an entangled state of polarization is created by parametric down conversion of a pump light. A first photon of the two photons is sent to a sender while a second photon of the two photons is sent to a receiver. The second photon is divided into a first component and a second component. The receiver makes the first component interact with an isotropic nonlinear optical medium. The sender selects the angle of a polarizer according to a signal that he wants to transmit to the receiver and measures the first photon after it passes the polarizer. The receiver mixes the first component and the second component by a half beam splitter. The receiver knows the signal by measuring the probability of photon detection of two output lights from the half beam splitter.

1 Claim, 3 Drawing Sheets

COMMUNICATION METHOD USING THE ENTANGLED STATE

FIELD

The embodiments discussed herein are related to a communication method using the entangled state, and a communication method using optical Kerr effect or nonlinear refractive index of an isotropic nonlinear optical medium.

BACKGROUND OF THE INVENTION

For current communication technology, telecommunication or optical fiber communication has been widely used. In the communication method that uses electricity or light, the signal transmission speed is limited below speed of light.

On the other hand, the quantum communication technology or quantum cryptography based on the principle of quantum mechanics is being actively researched.

Moreover, the quantum teleportation, reproducing a quantum state in another system, is also being researched using the entangled state. In the quantum code or the quantum teleportation, the collapse of the wave packet (decoherence) is used. The collapse of the wave packet occurs instantly when measurement is done, and a strong correlation appears in each measurement result of each part in the entangled state.

However, it is said that it is not possible to use the entangled state to send information because an individual measurement result of the entangled state is quite random and we cannot arbitrarily choose the measurement result. Therefore, even in the quantum code or the quantum teleportation, the communication process at the speed below speed of light is needed to transmit information. So, the signal transmission speed becomes below speed of light.

Japanese patent publication No. P2011-166250A shows a communication method using an entangled state of two photons and an isotropic nonlinear optical medium. But P2011-166250A uses an interaction between one of the two photons and an isotropic nonlinear optical medium after another one of the two photons is detected. So, the communication speed is limited by the time of interaction between one of the two photons and the isotropic nonlinear optical medium.

Related references are as follows:
Eur. Phys. J. D (2012) 66: 70
Japanese patent publication No. P2011-166250A FUNDAMENTALS OF PHOTONICS (1991 John Wiley & Sons, Inc)

BRIEF SUMMARY OF THE INVENTION

According to an aspect of the first embodiment, a communication method comprising: a first step that two photons in an entangled state of polarization are created by parametric down conversion of a pump light in a first nonlinear optical medium; a second step that a first photon of the two photons is sent to a sender, and a second photon of the two photons is send to a receiver; a third step that the second photon passes through a quarter-wave retarder, and the second photon is divided into a first component and a second component by a first half beam splitter, and a first component of the second photon gets into a second isotropic nonlinear optical medium, and the first component of the second photon interacts with the second isotropic nonlinear optical medium via a change of nonlinear refractive index of the second isotropic nonlinear optical medium; a fourth step that the sender measures the first photon in a first detector after the first photon passes through a polarizer set in 0 degrees when the sender sends a first signal, while the sender measures the first photon in the first detector after the first photon passes through a polarizer set in 45 degrees when the sender sends a second signal; a fifth step that the first component and the second component of the second photon are mixed in a second half beam splitter, and two output lights of the second half beam splitter are measured in a second detector and a third detector; a sixth step that the receiver knows the signal sent from the sender by detecting the difference of the results of measurement in the second detector and the third detector.

DETAILED DESCRIPTION OF THE INVENTION

Communication Method of the First Embodiment

Figure 1:
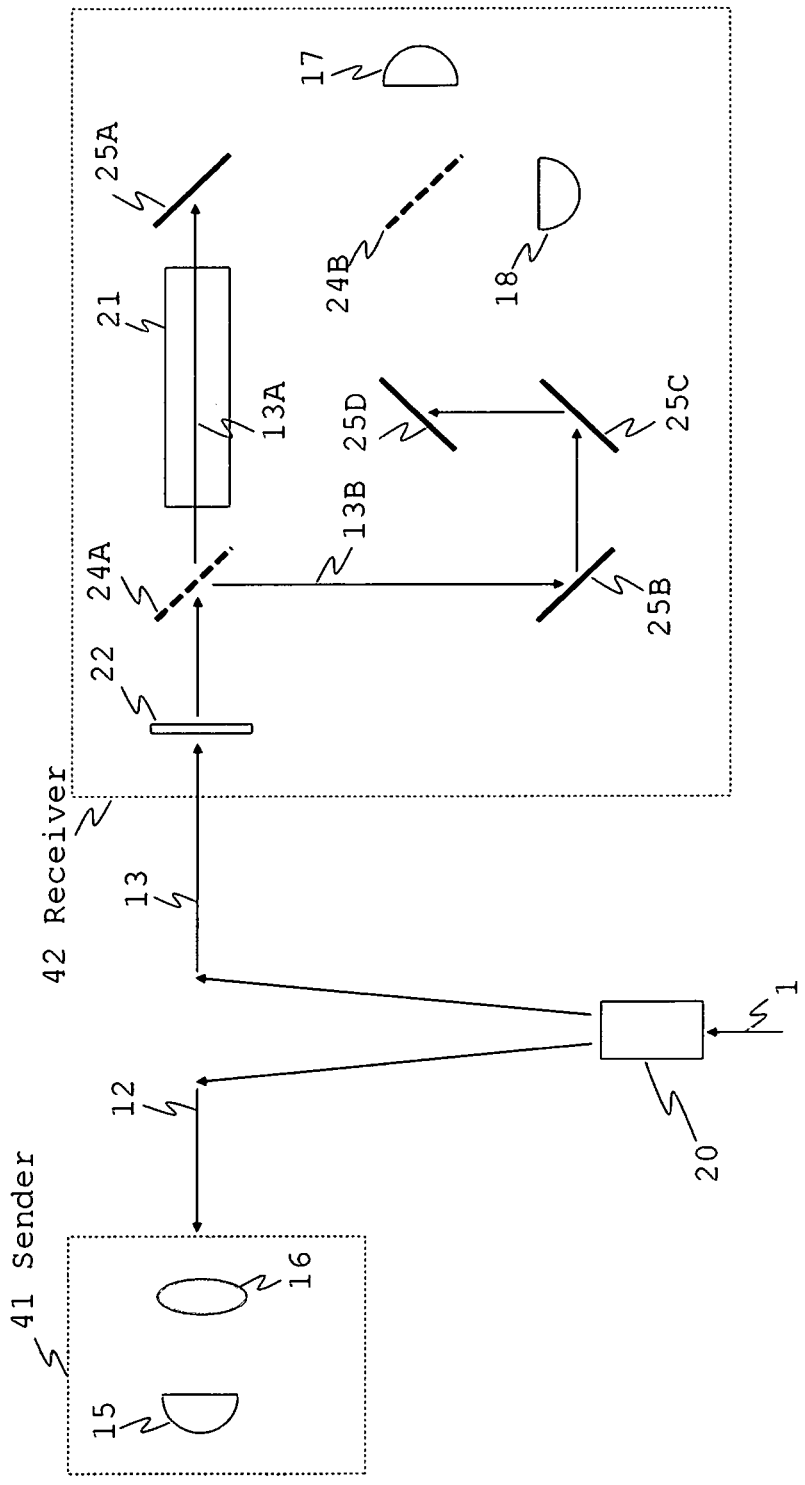
FIG. 1 is a schematic view of the instruments for the communication method of the first embodiment where the first photon 12 doesn't arrive yet at the polarizer 16 and the first component 13A of the second photon 13 is passing the second isotropic nonlinear optical medium 21.
Figure 2:
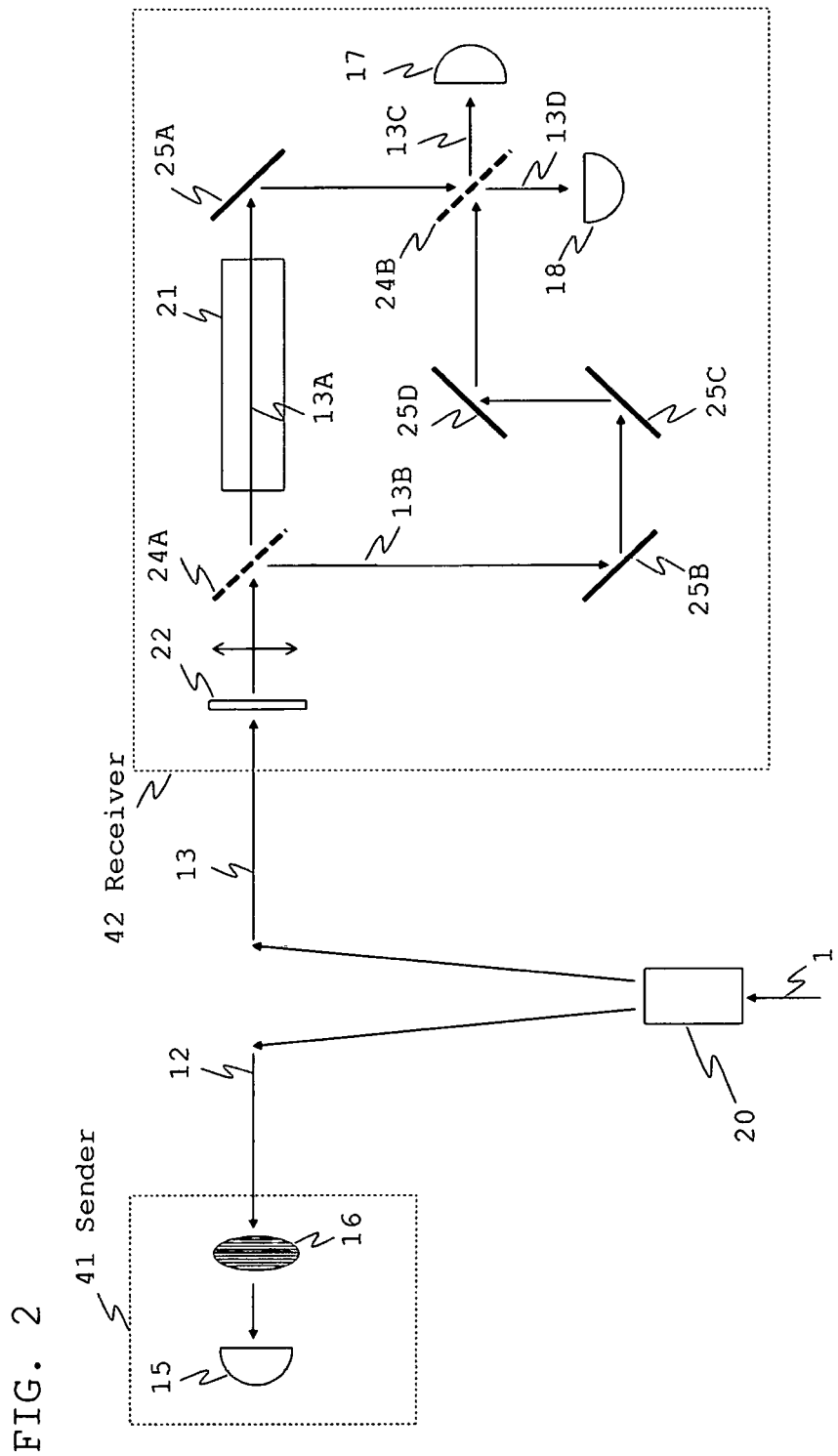
FIG. 2 is a schematic view of the instruments for the communication method of the first embodiment where the first photon 12 is measured by the first detector 15 after passing the polarizer 16 set in 0 degrees, and the first output light 13C and the second output light 13D is measured by the second detector 17 and the third detector 18.
Figure 3:
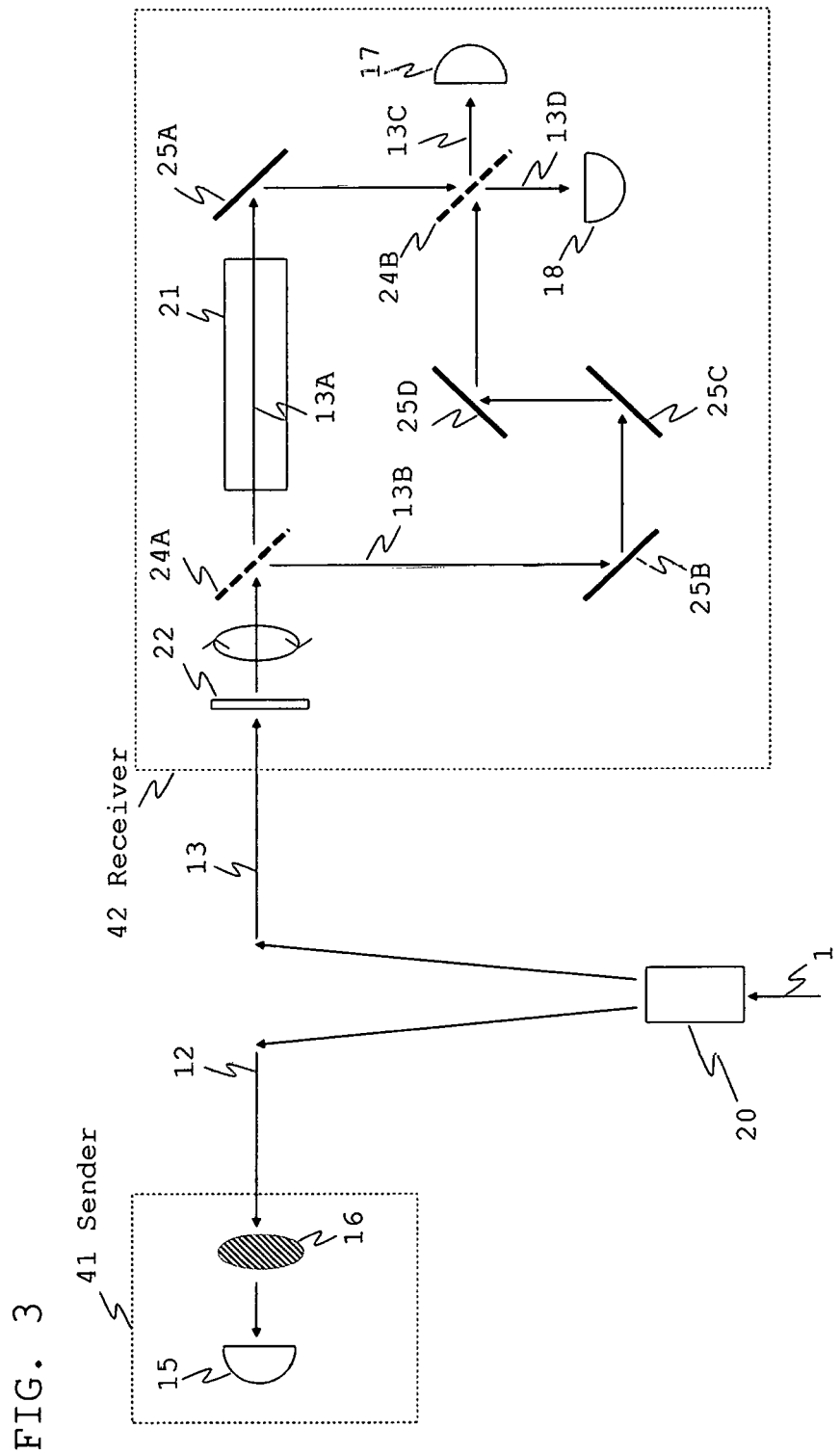
FIG. 3 is a schematic view of the instruments for the communication method of the first embodiment where the first photon 12 is measured by the first detector 15 after passing the polarizer 16 set in 45 degrees, and the first output light 13C and the second output light 13D is measured by the second detector 17 and the third detector 18.

A method for communication according to the present first embodiment will be described with reference to FIGS. 1 to 3. FIGS. 1 to 3 are schematic views of the instruments according to the first embodiment. The related references are non-patent document, "Eur. Phys. J. D (2012) 66: 70" and Japanese patent publication No. P2011-166250A. In FIG. 1, a dotted line 41 means instruments of a sender and a dotted line 42 means instruments of a receiver. A first nonlinear optical medium 20 is arranged between the sender and the receiver.

A pump light 1 gets into the first nonlinear optical medium 20. And, by parametric down conversion of the pump light 1 in the first nonlinear optical medium 20, a first photon 12 and a second photon 13 are created with a certain probability. And the first photon 12 and the second photon 13 are in an entangled state of polarization expressed as follows;

$$\Phi 0 = \frac{|H1\rangle|H2\rangle + |V1\rangle|V2\rangle}{\sqrt{2}} = \frac{|D1\rangle|D2\rangle + |E1\rangle|E2\rangle}{\sqrt{2}} \quad \text{Equation 1}$$

where |H1> and |H2> mean the 90 degrees polarization state of the first photon 12 and the second photon 13. And |V1> and |V2> mean the 0 degrees polarization state of the first photon 12 and the second photon 13. |D1> and |D2> mean the 45 degrees polarization state of the first photon 12 and the second photon 13. |E1> and |E2> mean the −45 degrees polarization state of the first photon 12 and the second photon 13. The state expressed in Equation 1 is called an entangled state of polarization.

In FIG. 1, the second photon 13 passes through a quarter-wave retarder 22, and the second photon 13 is divided into a first component 13A and a second component 13B by a first half beam splitter 24A. Then the first component 13A of the second photon 13 gets into a second isotropic nonlinear optical medium 21. The first component 13A of the second photon 13 interacts with the second isotropic nonlinear optical medium 21 via the change of nonlinear refractive index of the second isotropic nonlinear optical medium 21. The first component 13A of the second photon 13 produces electric polarization P expressed as follows in the second isotropic nonlinear optical medium 21, $$P = \chi^E + A(E^* \cdot E)E + \frac{1}{2}B(E \cdot E)E^* \qquad \text{Equation 2}$$

where $\chi$ is linear susceptibility, and A and B are nonlinear susceptibilities, and E means electric field of the first component 13A of the second photon 13, and E* means complex conjugate of E. Above Equation 2 is shown in non-patent document "Eur. Phys. J. D (2012) 66: 70".

The refractive index of the second isotropic nonlinear optical medium 21 is obtained from the electric polarization P of Equation 2. So, the refractive index N1, in the case of the first component 13A of the second photon 13 with 0 degrees polarization or 90 degrees polarization, is as follows, $$N1 = n + \frac{2\pi}{n}\left(A + \frac{1}{2}B\right)|E|^2 \qquad \text{Equation 3}$$

where |E| means the amplitude of the electric field and n means the linear refractive index that is not derived from nonlinearity of the second isotropic nonlinear optical medium 21. In Equation 2, the third term vanishes when the electric field E is a circular polarization. So, the refractive index N2, in the case of the first component 13A of the second photon 13 with a circular polarization, is as follows, $$N2 = n + \frac{2\pi}{n}A|E|^2 \qquad \text{Equation 4}$$

As shown in FIG. 2, the first photon 12 passes through a polarizer 16 in a state that a light with 0 degrees polarization can pass when the sender wants to send a first signal. And the first photon 12 is detected by a first detector 15. Then the polarization state of the first photon 12 is settled in the 0 degrees polarization or 90 degrees polarization. At the same time, the polarization state of the second photon 13 is also settled in the 0 degrees polarization or 90 degrees polarization because the first photon 12 and the second photon 13 are in the entangled state of polarization expressed as Equation 1. This change of photons state is called the collapse of the wave packet (decoherence). The collapse of the wave packet (decoherence) by the measurement is assumed to occur almost instantly at very short time. After the detection by the first detector 15, the first photon 12 and the second photon 13 are in a state expressed as follows, $$\Phi 1 = |H1\rangle|H2\rangle \text{ or } |V1\rangle|V2\rangle \qquad \text{Equation 5}$$

Because the second photon 13 is settled to the state of 0 degrees polarization or 90 degrees polarization, the second photon 13 is in the state of linear polarization after it passes a quarter-wave retarder 22 with optical axis set in 0 and 90 degrees. This behavior of polarization is explained in non-Patent document "FUNDAMENTALS OF PHOTONICS (1991 John Wiley & Sons, Inc) Chapter 6". The second photon is divided into a first component 13A and a second component 13B by a first half beam splitter 24A. The first component 13A passes the second isotropic nonlinear optical medium 21 and is reflected by a mirror 25A. The second component 13B is reflected by mirrors 25B,25C,25D. The first component 13A and the second component 13B are mixed in a second half beam splitter 24B, and a first output light 13C and a second output light 13D are created. The first output light 13C is measured by a second detector 17. The second output light 13D is measured by a third detector 18.

In this case, the first component 13A feels the refractive index N1 expressed in Equation 3 in the isotropic nonlinear optical medium 21. By optimizing optical path length of the first component 13A and the second component 13B, the probability that the third detector 18 detects the second output light 13D can be set zero. To optimize optical path length, the distance between the mirror 25B and the first half beam splitter 24A and the distance between the mirror 25C and the mirror 25D can be changed.

As shown in FIG. 3, the first photon 12 passes through a polarizer 16 in a state that a light with 45 degrees polarization can pass when the sender wants to send a second signal. And the first photon 12 is detected by a first detector 15. Then the polarization state of the first photon 12 is settled in the 45 degrees polarization or −45 degrees polarization. At the same time, the polarization state of the second photon 13 is also settled in the 45 degrees polarization or −45 degrees polarization because the first photon 12 and the second photon 13 are in the entangled state of polarization expressed as Equation 1. After the detection by the first detector 15, the first photon 12 and the second photon 13 are in a state expressed as follows, $$\Phi 1 = |D1\rangle|D2\rangle \text{ or } |E1\rangle|E2\rangle \qquad \text{Equation 6}$$

Because the second photon 13 is settled to the state of 45 degrees polarization or −45 degrees polarization, the second photon 13 is in the state of a circular polarization after it passes a quarter-wave retarder 22 with optical axis set in 0 and 90 degrees. This behavior of polarization is explained in non-Patent document "FUNDAMENTALS OF PHOTONICS (1991 John Wiley & Sons, Inc) Chapter 6". The second photon 13 is divided into a first component 13A and a second component 13B by a first half beam splitter 24A. The first component 13A passes a second isotropic nonlinear optical medium 21 and is reflected by a mirror 25A. The second component 13B is reflected by mirrors 25B,25C,25D. The first component 13A and the second component 13B are mixed in a half beam splitter 24B, and a first output light 13C and a second output light 13D are created. The first output light 13C is measured by a second detector 17. The second output light 13D is measured by a third detector 18.

In this case, the first component 13A feels the refractive index N2 expressed in Equation 4 in the isotropic nonlinear optical medium 21. The probability that the third detector 18 detects the second output light 13D can be set nonzero finite value, because the refractive index N2 in the case of the second photon 13 with the circular polarization is different from the refractive index N1 in the case of the second photon 13 with the linear polarization.

So, the receiver can know the signal that the sender sends by repeating above mentioned sequence multiple times. If the third detector 18 doesn't detect the second photon while repeating above sequence, the receiver knows that the sender sends the first signal. If the third detector 18 detects the second photon while repeating above sequence, the receiver knows that the sender sends the second signal.

In above sequence, the sender doesn't use the measurement results of the detector 15 for communication. Only the selection that the sender selects the angle of the polarizer 16, 0 degrees or 45 degrees, is used for communication. So, the receiver can know the signal that the sender sends in spite of the randomness of the measurement results of the detector 15. In other words, the physical result changes depending on which base of an entangled state is selected. When the detector 15 detects the first photon 12, the polarization state of the second photon 13 is also fixed almost instantly in very short time. So, above sequence enables superluminal communication in principle. And more, above mentioned sequence will work even if the first detector 15 measures the first photon 12 after the first component 13A of the second photon 13 passes the isotropic nonlinear optical medium 21 before it enters the second half beam splitter 24B. This is because the entangled state expressed in Equation 1 remains unbroken until the first photon 12 or the second photon 13 is measured.

A method of communication using the above-mentioned composition is explained here. Two photons in an entangled state of polarization are created by parametric down conversion of the pump light 1 in a first nonlinear optical medium 20. A first photon 12 is sent to a sender, and a second photon 13 is sent to a receiver.

The second photon 13 passes a quarter-wave retarder 22 with optical axis set in 0 and 90 degrees. The second photon 13 is divided into a first component 13A and a second component 13B by a first half beam splitter 24A. The first component 13A passes a second isotropic nonlinear optical medium 21 and is reflected by a mirror 25A. The second component 13B is reflected by mirrors 25B,25C,25D.

The sender selects an angle of a polarizer 16, 0 degrees or 45 degrees, according to the signal that the sender wants to transmit to the receiver. The angle of the polarizer 16 is set in 0 degrees in the case that the sender transmits a first signal. Moreover, in the case that the sender transmits a second signal, the angle of the polarizer 16 is set in 45 degrees. And the first photon 12 is measured by a first detector 15 after the first photon 12 passes the polarizer 16. After the second photon 13 passes the quarter-wave retarder 22, the second photon 13 is in the state of linear polarization when the sender transmits the first signal. After the second photon 13 passes the quarter-wave retarder 22, the second photon 13 is in the state of circular polarization when the sender transmits the second signal.

The first component 13A and the second component 13B are mixed in a second half beam splitter 24B, and a first output light 13C and a second output light 13D are created. The first output light 13C is measured by a second detector 17. The second output light 13D is measured by a third detector 18. The first component 13A and the second component 13B are in the state of linear polarization or circular polarization according to the signal the sender transmits. So, the refractive index of the second isotropic nonlinear optical medium 21 differs according to the signal the sender transmits. This difference of the refractive index causes a difference of probability of photon detection by the second detector 17 and the third detector 18. Especially, the receiver can set the instruments 42 so that the third detector 18 doesn't detect the second output light 13D when the sender sends the first signal. And the receiver can set the instruments 42 so that the third detector 18 detects the second output light 13D with finite probability only when the sender sends the second signal.

So, the receiver can know the signal the sender sends by repeating above sequence multiple times. Japanese patent publication No. P2011-166250A uses an interaction between a first component of the second photon and an isotropic nonlinear optical medium after a first photon is detected. So, the above-mentioned method, wherein the interaction between the first component 13A of the second photon 13 and the isotropic nonlinear optical medium 21 occurs before the first photons 12 is detected, has great advantage on the speed of communication.

In the above-mentioned method, the selection that the sender sets the angle of the polarizer 16, 0 degrees or degrees, is used to transmit the signal. Because the measurement result is not used to transmit the information, the randomness of measurement result doesn't matter. The collapse of the wave packet (decoherence) by the measurement is assumed to occur almost instantly at very short time. Therefore, the signal transmission speed beyond speed of light can be achieved in principle.

What is claimed is:

1. A method for communication comprising;
a first step that two photons in an entangled state of polarization are created by parametric down conversion of a pump light in a first nonlinear optical medium;
a second step that a first photon of the two photons is sent to a sender, and a second photon of the two photons is sent to a receiver;
a third step that the second photon passes a quarter-wave retarder, and the receiver divides the second photon into a first component and a second component, and the receiver makes the first component pass a second isotropic nonlinear optical medium;
a fourth step that the sender measures the first photon after the first photon passes a polarizer set in 0 degrees in the case that the sender sends a first signal, while the sender measures the first photon after the first photon passes a polarizer set in 45 degrees in the case that the sender sends a second signal;
a fifth step that the receiver mixes the first component and the second component in a half beam splitter and creates a first output light and a second output light, and measures the first output light and the second output light;
a sixth step that the receiver knows that the signal is the first signal in the case that the second output light is not detected, while the receiver knows that the signal is the second signal in the case that the second output light is detected;
wherein the sixth step is executed after a sequence from the first step to the fifth step is repeated multiple times.

* * * * *